Sept. 9, 1952    F. A. ANDERSON    2,610,084
VEHICLE DOOR CLOSING DEVICE
Filed Sept. 19, 1951    2 SHEETS—SHEET 1

INVENTOR
FRANK A. ANDERSON
BY H. O. Vogel
ATT'Y

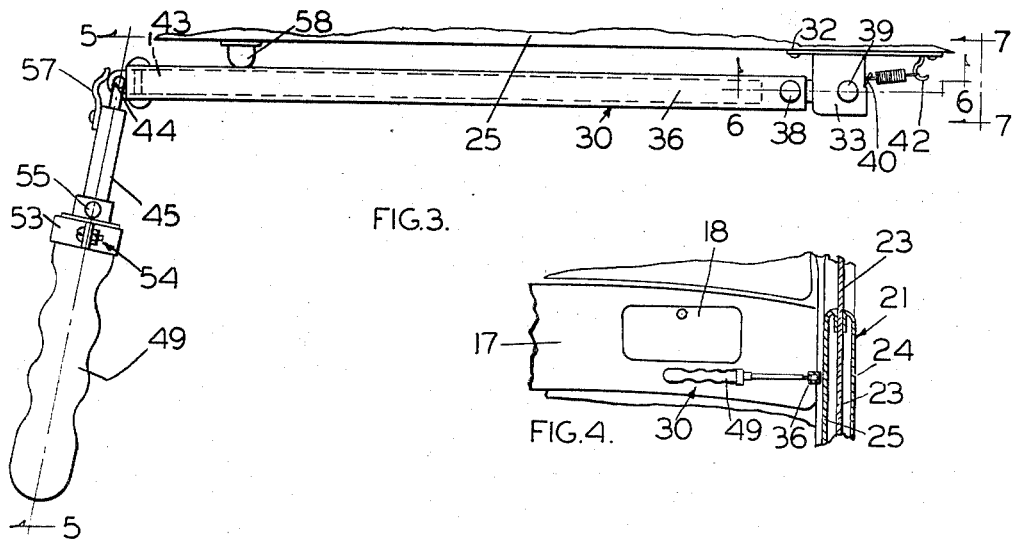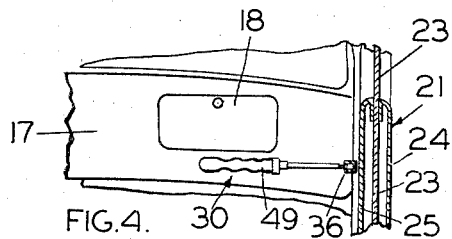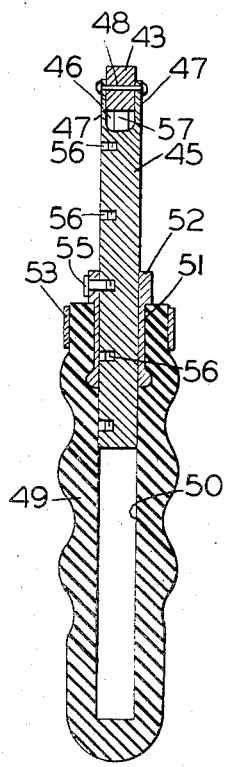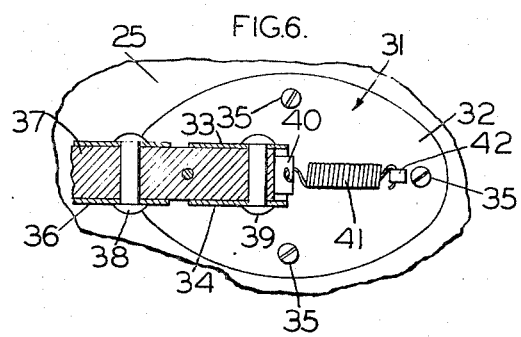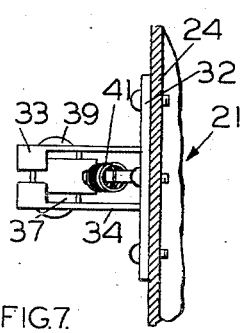

Patented Sept. 9, 1952

2,610,084

UNITED STATES PATENT OFFICE 2,610,084

VEHICLE DOOR CLOSING DEVICE

Frank A. Anderson, Chicago, Ill.

Application September 19, 1951, Serial No. 247,249

6 Claims. (Cl. 296—44)

This invention relates to a vehicle door closing device. More particularly this invention relates to a device for facilitating the closing of a vehicle door, the door being disposed on an opposite side of the vehicle with respect to the operator's station.

In present day design automobiles, and particularly in two-door sedans, the doors of the vehicles are quite large and swing outwardly a considerable distance when opened. For the occasional driver of average size the problem of closing the door, which is positioned on the far side from the operator's station, has probably never become acute. However, in the case of salesmen, doctors, and other business men who use their cars daily and continually, the door closing chore has become a particularly serious and fatiguing task. In the interest of safety it is of course desirable to enter and exit to and from the car by means of the door which is located on the far side removed from the operator's station. The problem of leaving an automobile from this side is of course not serious since the driver slides over from his side and makes his exit. However, on entering into the car another problem is presented. After the operator has entered from the far side he quite naturally seats himself in the operator's station and the door on the far side remains open. In order to close the door he must now reach over, stretch and generally contort himself or slide over to the side of the seat nearest the open door in order to grasp the conventional type of handle which is connected to the inside wall of the door. To those who have present day design automobiles and particularly two-door sedans this problem has probably confronted them many times. This stretching, moving about and otherwise engaging in contortions to close the door is especially bothersome to the person who uses his car daily and who must make numerous exits. The problem is serious for the larger than average individual, and of course for the less than average size person it is a much greater nuisance which seriously curtails his efficiency in every day work. It is a prime object of this invention therefore to provide an improved door closing device or attachment which can easily be attached to, or built in the side of a vehicle door, the attachment providing a handle means whereby the operator can grasp the door from the operator's station without the need of excessively moving about or stretching in order to accomplish the same.

It is another object to provide an improved door closing device comprising an arm which is pivotally connected to the door in an out of the way position when the door is closed, said arm being arranged within easy reach of the operator's station so that the operator can readily grasp the same for closing the door when the door is in its open position.

Still another object is to provide a door closing device comprising a pair of arms which are pivotally connected together one of the arms being pivotally connected to the inside wall of a vehicle door, the arms being arranged in an out of the way position when the door is closed, the said arms providing means whereby the operator can readily grasp the same from the operator's station for closing the door when the door is in an open position.

A still further object is the provision of a door closing device consisting of an arm which is pivotally connected to the inside surface of a vehicle door, the arm extending in a longitudinal direction with respect to the door, the arm having a second arm pivotally connected thereto, the second arm extending laterally inwardly toward the vehicle, the said second arm being disposed within easy reach of the operator's station when the door has been moved to an open position so that the operator can grasp the same and move both of said arms in a direction whereby they both extend in an elongated formation laterally inwardly with respect to the vehicle door.

These and other objects will become more readily apparent from a reading of the specification when examined in connection with the accompanying sheets of drawings:

In the drawings,

Figure 3 is an enlarged plan view of a door closing device attached to the side door of a vehicle;

Figure 4 is a sectional view taken substantially along the line 4—4 of Figure 1, showing the portions of a door closing device in relative position with respect to certain portions of the vehicle;

Figure 5 is a sectional view through a portion of a door closing device, the view being taken substantially along the line 5—5 of Figure 3;

Figure 6 is a fragmentary view of a bracket, the view being taken substantially along the line 6—6 of Figure 3;

Figure 7 is an end view of a door closing device showing a bracket, the view being taken substantially along the line 7—7 of Figure 3.

Figure 1:
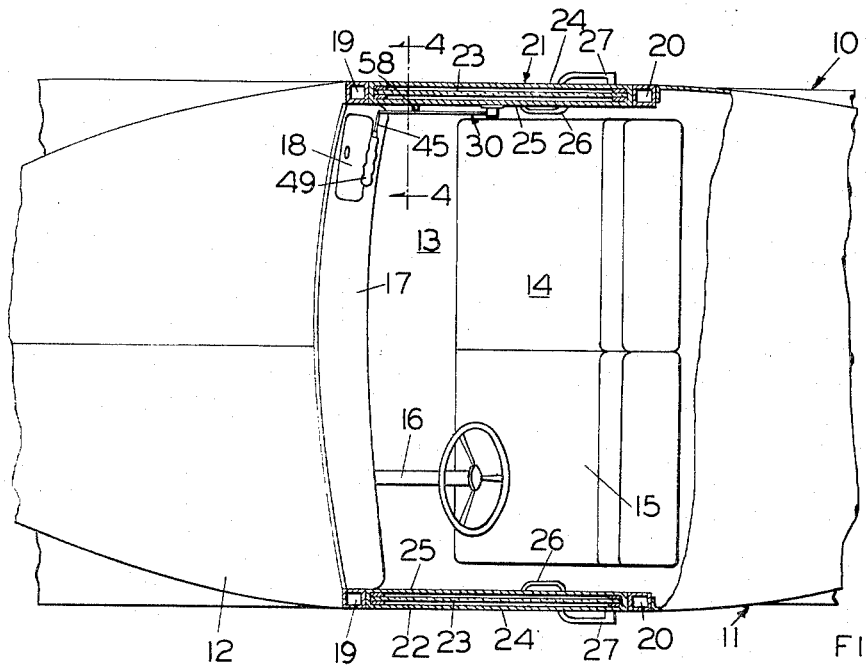
Figure 1 is a plan view of a vehicle showing the doors of the vehicle in section in their closed position, the door remotely removed from their operator's station having an improved door closing device connected thereto.
Figure 2:
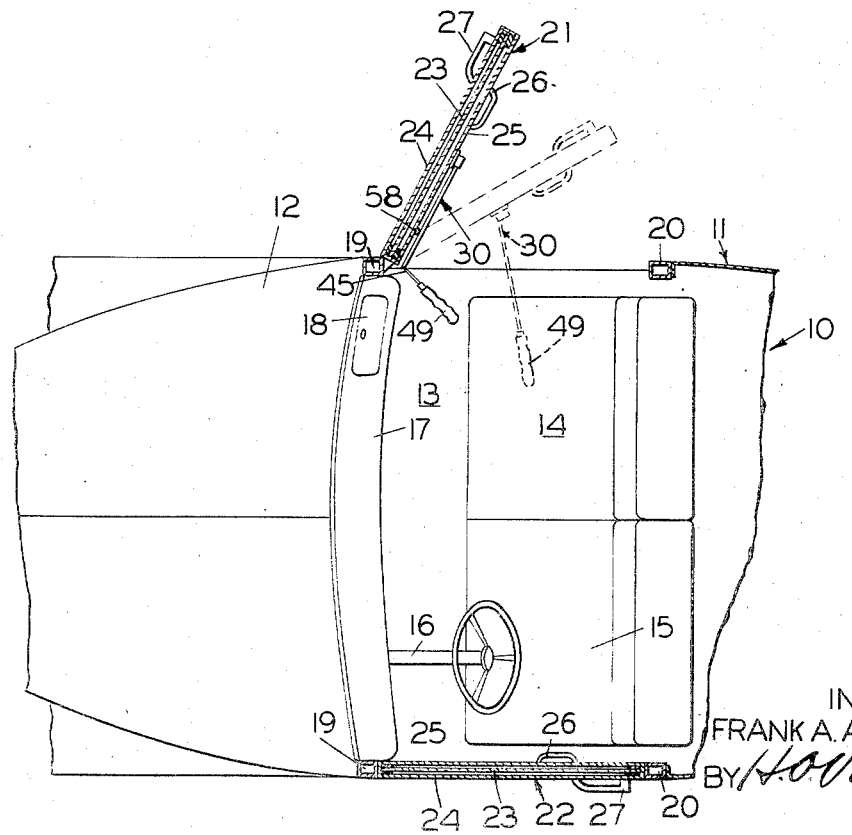
Figure 2 is a plan view of a vehicle similar to Figure 1 showing one of the vehicle doors in an open position, the vehicle door having an improved door closing device connected thereto, and showing the device in an operating position.

Referring now to Figures 1 and 2 the invention with which the present specification is concerned is applicable to any conventional vehicle but especially so to two-door sedans. An automotive vehicle of such a type is generally referred to by the reference character 10. The vehicle 10 comprises a body 11, which is provided at its forward end with a conventional type of hood 12. Immediately in back of the hood 12 a front seat compartment 13 is provided. The front seat compartment 13 is provided with a front seat 14, a portion of which is considered as the operator's station 15. The operator's station 15 is immediately adjacent a steering post or mechanism 16 which projects toward the operator's station 15 from underneath a transversely extending dashboard 17. The dashboard 17 may be provided with the usual instruments found in automotive vehicles. On the side of the dashboard 17, farthest removed from the operator's station 15 a glove compartment 18 is provided.

The body 11 of the vehicle 10 is provided with conventional type of laterally spaced box type front door posts 19 and laterally spaced box type rear door posts 20. Conventional type doors 21 and 22 are hingedly connected to the front posts 19, the doors being so arranged that they swing outwardly with respect to the front seat compartment 13. The doors 21 and 22 are provided with the standard type of sliding windows 23, none of the window mechanisms here being shown since they perform no part in the present invention. The hinge doors 21 and 22 are provided respectively with outer sides 24 and inner sides 25. The inner sides 25 are provided with standard type handles 26 and the outer sides 24 are provided with outer handles 27.

Referring now to Figures 3 through 7, a door closing attachment or device is generally indicated by the reference character 30. The device 30 is pivotally connected to a bracket 31. The bracket 31 consists of a flat plate 32 from which project upper and lower bracket members 33 and 34 respectively. The bracket 31 is attached to the inner side 25 of the door 21. The attachment may be made by any suitable attaching device such as sheet metal screws 35. An arm 36 is connected to the bracket 31, the said arm 36 extending in a longitudinal direction with respect to the door 21. The arm 36 may be of any suitable construction the present disclosure showing the arm as consisting of a square tubular member. One end of the arm 36 is in telescoping engagement with a short section of rod 37 which projects outwardly from the said tubular arm 36. The rod 37 is securely connected to the tubular member 36 by means of a rivet 38. The rod 37 projects between the bracket members 34 and 35 and is pivotally connected thereto by means of a suitable pivot such as a rivet or bolt 39. As indicated best in Figures 6 and 7, the end of the rod 37 is provided with a flap 40 which may be integrally formed with the rod 37 or may be suitably welded thereto. A spring 41 is connected to the flap 40, the spring, at its other end, being hooked about a catch 42 which projects outwardly from the bracket 31. The forward end of the arm 36 is provided with a short section of rod 43 which is in telescoping engagement with the tubular arm 36. A rivet 44 securely holds the rod 43 in connection with the tubular arm 36, the rod 43 projecting outwardly from the tubular arm 36.

An arm 45 of considerably shorter length than the arm 36 is pivotally connected to the rod 43. The short arm 45 as best indicated in Figures 1 and 2 normally extends in a direction angularly with respect to the arm 36, or laterally with respect to the arm 36, and to the door 21. One end of the arm 45 is provided with a recess 46 which in turn define a pair of extensions 47. The rod 43 is disposed within the recess 46, the extensions 47 being disposed on opposite sides of the rod 43 and being pivotally connected thereto by means of a pivot member 48.

The arm 45 has a gripping member 49 adjustably connected thereto. The gripping member may be made of any suitable material such as rubber, neoprene, or suitable synthetics to provide an effective gripping surface for the hand of an operator. The gripping member 49 includes a longitudinally extending bore 50 which receives the arm 45 in telescoping relation. A sleeve 51 is disposed at one end of the gripping member 49. The sleeve 51, includes a shoulder or collar 52 which projects outwardly from the gripping member 49. A band 53 encircles one end of the gripping member 49, the band 53 being securely connected to the gripping member by means of a fastener 54. Thus it can be seen that the gripping member 49 is securely connected to the sleeve 51. A set screw 55 extends inwardly through the collar 52 and engages one of a plurality of recesses 56 which are longitudinally spaced in the arm 45, and which permit adjustment of the gripping member 49 to a plurality of positions.

The arm 49 is normally in the position shown in Figures 1 and 3, wherein said arm is disposed in a lateral position with respect to the arm 36 and to the door 21. This positioning of the arm 45 is effected by means of a leaf spring 57 which is connected to the arm 45. The leaf spring 57 urges the arm continually to the position indicated by virtue of its bearing engagement with the end of the rod 43. In other words when the arm 45 is positioned in longitudinal alignment with respect to the arm 36 the spring 57 will be effective to urge the arm 45 to the position indicated in Figure 3.

Referring now particularly to Figures 1 and 2, the operation of the door closing device is clearly disclosed. When the door 21 is in its normally closed position the arm 36 extends in a longitudinal direction with respect to the door 21 and with respect to a center line through the vehicle. The spring 41 normally holds the arm 36 in this position, as best indicated in Figure 3, the said arm being in engagement with a rubber bumper element 58 which is suitably connected to the inside surface 25 of the door 21. In this normal position the arm 45 is positioned as indicated. The arm 45 is positioned immediately below the glove compartment 18 of the conventional automobile and does not interfere with the opening and closing of said compartment. The present door closing device is particularly well adapted for attachment to the standard car after it has left the factory. It of course must be understood that provisions may be made by the manufacturer to provide recesses within the door and dash board so that the arms 36 and 45 can be further disposed in an out of the way position. For the purpose of clarity however the present embodiment is shown.

In Figure 2 the door 21 has been moved to an open position and it is now ready to be closed. As the door 21 is moved to the open position shown in Figure 2 the arm 45 maintains the normal angular relationship with respect to the arm 36 and moves to the position shown in Figure 2. In this position the arm 45 extends in a direction diagonally toward the operator's station 15. After the operator has entered and is seated in the operator's station 15, he can very easily, and without excessively stretching or sliding on the seat, grasp the gripping member 49 whereupon he pulls inwardly. As he pulls inwardly the arms 45 and 36 are straightened with respect to each other and both now extend in a direction laterally with respect to the door 21. This is indicated in the dotted line position shown in Figure 2. Both arms 36 and 45 have now pivoted to the position shown and the operator merely pulls inwardly and the door 21 is closed. After the door 21 has thus been closed, the operator merely releases his grasp from the gripping member 49, the springs 41 and 57 are effective to urge the arms 45 and 36 to their normal position as indicated in Figure 1. Thus it can be seen that the operator need not stretch and contort himself in order to close the door 21. He merely reaches over toward the glove compartment whereupon he can quickly grasp the gripping member 49 and pull the door closing device to the extended position so that he now can effectively close the door 21.

It can now be seen that an improved door closing device has been disclosed. This device is of particular advantage to individuals who are continually using their cars in their work and must enter and exit many times during the normal working day. This device is also of particular advantage to individuals who are of less than average size and who find it difficult to close the door, remotely removed from the operator's station, by the usual conventional handle. If desired, the gripping member 49 can be adjusted with respect to the arm 45 so that varying sized persons with varying length arms can be accommodated. By merely adjusting the set screw 55 it can be seen that the gripping member 49 may be disposed along a plurality of positions with respect to the arm 45.

The door gripping device shown may be constructed of any suitable materials, it being desirable of course to design the same in a manner which will enhance the ordinary appurtenances of the automobile. The device may be supplied as an attachment or it may be built in the automobile as it is manufactured. In the latter case, as above mentioned, provisions can easily be made to recess the arms 45 and 36 in the structure of the automobile so that the arms are completely in an out of the way position during the normal position of the door.

It can now be seen that the object of the invention has been fully achieved. Changes and modifications of course can be made which will not depart from the spirit of the invention as disclosed nor from the scope thereof as defined in the appended claims.

What is claimed is:

1. A handle device for vehicle doors comprising a bracket adapted to be attached to the inner side of a vehicle door, a first arm pivotally connected to said bracket for swinging movement about a vertical axis, a resilient member connected to said first arm for urging said arm to a normal position substantially in longitudinal parallel relation with respect to the vehicle door, said first arm being movable from said position to a position wherein said first arm extends laterally inwardly into the vehicle, a second arm pivotally connected to said first arm for pivotal movement about a vertical axis, said second arm being of substantially shorter length than said first arm, said second arm extending normally in a lateral direction with respect to the first arm and inwardly into the vehicle, a gripping member slidably connected to said second arm, said gripping member being adjustable on said second arm to a plurality of positions, and means for locking said gripping member to said second arm, said first and second arms being swingable by an operator into a position wherein both arms extend laterally with respect to said door, and a second resilient member connected to said first and second arms, said resilient members being operable to return said arms to their normal positions upon release of said gripping member by the operator.

2. A handle device for a hinged vehicle door comprising a bracket adapted to be attached to the inner side of a vehicle door, a first arm pivotally connected to said bracket said first arm extending normally in a longitudinal direction with respect to said door, a resilient member connected to said first arm, said resilient member being arranged to urge said first arm to the normal position, a second arm pivotally connected to said first arm, said second arm extending normally in a lateral direction with respect to said first arm, a second resilient member connecting said first and second arms for urging said second arm to said normal position, and a gripping member connected to said second arm, said first and second arms being swivable from the normal positions by an operator into a position wherein both arms are positioned in a laterally extended position with respect to said door, said resilient members being arranged to return said arms to their normal position upon release of the gripping member by the operator.

3. A handle device for a hinged vehicle door comprising a bracket adapted to be attached to the inner side of a vehicle door, a first arm pivotally connected to said bracket said first arm extending normally in a longitudinal direction with respect to said door, a resilient member connected to said first arm, said resilient member being arranged to urge said first arm to the normal position, and a second arm pivotally connected to said first arm, said second arm extending normally in a lateral direction with respect to said first arm, a second resilient member connecting said first and second arms for urging said second arm to said normal position, said first and second arms being swivable from the normal positions by an operator into a position wherein both arms are positioned in a laterally extended position with respect to said door, said resilient members being arranged to return said arms to their normal position upon release of the arms by the operator.

4. For a vehicle having a hinged door arranged to swing outwardly in a lateral direction with respect to the body of the vehicle; a handle device comprising a bracket adapted to be attached to the inner side of the hinged door, a first arm pivotally connected to said bracket, said first arm extending longitudinally with respect to said door and the vehicle, a resilient member connected to said first arm for normally urging said first arm to said normal position, a second arm pivotally connected to said first arm, said second arm extending normally in a lateral direction with respect to said first arm, and a second resilient member connected between said first and second arms for normally urging said second arm to said normal position, said arms being swingable from the normal positions by an operator into a position wherein both arms extend laterally with respect to said door, said resilient members being arranged to return the arms to their normal position upon release of the arms by the operator.

5. For a vehicle having an operator's position and a hinged door arranged to swing outwardly in a lateral direction with respect to the body of the vehicle; a door closing device comprising a bracket adapted to be connected to the inner side of the door, a handle member pivotally connected to said bracket, said handle member having a generally L-shaped configuration during the closed position of said door, said handle member including a first arm extending longitudinally in substantially parallel relation with respect to said door, a second arm pivotally connected to said first arm, said second arm extending laterally inwardly toward said vehicle, said arms being swingable with respect to each other from the L-shaped configuration to an extended straightened position wherein both arms project in a lateral direction with respect to said door within reach of an operator stationed in the operator's position, and resilient means connected to said device for returning said arms to the L-shaped configuration upon closing of said door and the release of said arms by the operator.

6. A door closing device in accordance with claim 5, said resilient means including a first spring means connected to said first arm and to said door, and a second spring means connecting said first and second arms.

FRANK A. ANDERSON.

REFERENCES CITED

The following references are of record in the file of this patent:

UNITED STATES PATENTS

| Number | Name | Date |
|---|---|---|
| 1,629,195 | Archibald | May 17, 1927 |
| 1,840,204 | Kimball | Jan. 5, 1932 |
| 2,112,804 | Bahr | Mar. 29, 1938 |
| 2,224,371 | Witchger | Dec. 10, 1940 |
| 2,229,273 | Brockway | Jan. 21, 1941 |
| 2,563,248 | Kotzin | Aug. 7, 1951 |

FOREIGN PATENTS

| Number | Country | Date |
|---|---|---|
| 6,646 | Great Britain | Feb. 4, 1899 |